United States Patent [19]

Sonnenberg et al.

[11] Patent Number: 4,980,382
[45] Date of Patent: Dec. 25, 1990

[54] PROCESS FOR THE PREPARATION OF EXPANDABLE VINYL AROMATIC POLYMER PARTICLES CONTAINING HEXABROMOCYCLODODECANE

[75] Inventors: Fred M. Sonnenberg, Merion; Dennis M. Hajnik, West Chester, both of Pa.

[73] Assignee: ARCO Chemical Technology, Inc., Wilmington, Del.

[21] Appl. No.: 519,037

[22] Filed: May 4, 1990

Related U.S. Application Data

[63] Continuation of Ser. No. 459,171, Dec. 29, 1989.

[51] Int. Cl.$^5$ ................................................ C08J 9/18
[52] U.S. Cl. .................................... 521/60; 521/56; 521/57; 521/98; 521/907
[58] Field of Search ................ 521/56, 57, 60, 98, 521/907

[56] References Cited

U.S. PATENT DOCUMENTS 3,093,599 6/1963 Mueller-Tamm .
3,503,905 3/1970 Zuern et al. .
3,956,203 5/1976 Burger et al. .
4,281,067 7/1981 Kienzle et al. .................. 521/56
4,520,136 5/1985 Schwarz ........................ 521/60
4,761,432 8/1988 Sonnenberg et al. ............ 521/60
4,927,858 5/1990 Joyce et al. ..................... 521/59

FOREIGN PATENT DOCUMENTS 215740 9/1988 Japan .

OTHER PUBLICATIONS

Jpn. Kokai-63-215740 see Chem. Abs. 110, 193973r.

Primary Examiner—Morton Foelak
Attorney, Agent, or Firm—Stephen D. Harper

[57] ABSTRACT

Fire-retardant expandable vinyl aromatic polymer beads are prepared by an aqueous suspension method whereby micronized hexabromocyclododecane and a volatile aliphatic hydrocarbon foaming agent are incorporated into particles of a thermoplastic such as polystyrene. The beads are useful in the preparation of molded foam articles having excellent resistance to flame.

14 Claims, No Drawings

PROCESS FOR THE PREPARATION OF EXPANDABLE VINYL AROMATIC POLYMER PARTICLES CONTAINING HEXABROMOCYCLODODECANE

This is a continuation, of application Ser. No. 07/459,171, filed Dec. 29, 1989.

This invention pertains to methods for the preparation of fire-retardant expandable vinyl aromatic polymer beads which may be formed into molded foam products.

BACKGROUND OF THE INVENTION

Foamed thermoplastic polymers enjoy widespread use in building construction due to their low density and excellent heat insulating properties. For such uses, it is desirable that the foam be flame resistant and self-extinguishing in order to avoid any potential fire hazard. A variety of halogenated organic compounds, including hexabromocyclododecane, have been proposed as additives for this purpose.

Hexabromocyclododecane has been incorporated into foamed thermoplastics by several different methods. For example, Jpn. Kokai 63-215740 teaches that polystyrene and hexabromocyclododecane may be dry blended and then extruded with a volatile foaming agent. This method is not suitable for the preparation of expandable polystyrene beads, however.

U.S. Pat. No. 4,761,432 teaches a method of coating seed beads of polystyrene with hexabromocyclododecane wherein emulsion polymerization of a vinyl aromatic monomer is carried out in the presence of the fire-retardant and the seed beads. Incorporation of the fire-retardant was to be much more effective using the coating method than when the fire-retardant was added with the foaming agent during impregnation (Example II).

Another method of preparing expandable polystyrene beads containing hexabromocyclododecane is to polymerize styrene monomer in an aqueous suspension containing foaming agent and the fire-retardant, as illustrated by U.S. Pat. Nos. 3,093,599, 3,956,203, 3,503,905 and 4,281,067. While such procedures are effective and require a minimum number of processing steps, the presence of the hexabromocyclododecane during polymerization may possibly result in undesired changes in the molecular weight of the polystyrene produced due to chain termination or transfer reactions.

U.S. Pat. No. 3,093,599 teaches that polystyrene beads preimpregnated with a volatile hydrocarbon foaming agent may be rendered fire-retardant by coating the beads with hexabromocyclododecane using an adhesive agent such as paraffin wax. Such methods require a separate impregnation step and do not yield beads having the hexabromocyclododecane physically incorporated within the polymer. In addition, the coating may interfere with the desired expansion and fusion of the beads upon molding.

U.S. Pat. No. 4,520,136 describes an impregnation method whereby polystyrene beads and hexabromocyclododecane are suspended in water and heated to incorporate a volatile hydrocarbon blowing agent. Unless pentaerythritol tetrastearate is also present, however, foams prepared from the resulting impregnated beads have poor flame resistance.

It is clear there is a need for an improved method of incorporating hexabromocyclododecane into expandable vinyl aromatic polymer beads whereby molded foam articles prepared from the impregnated beads may be effectively rendered flame resistant.

SUMMARY OF THE INVENTION

This invention provides a method for preparing fire-retardant expandable thermoplastic beads comprising forming an aqueous suspension of 100 parts by weight vinyl aromatic polymer particles, from about 50 to 500 parts by weight water, an effective amount of a suspending agent, from about 0.1 to 2.5 parts by weight of hexabromocyclododecane having an average particle diameter of less than about 100 microns, and from about 3 to 20 parts by weight of a $C_4$–$C_6$ aliphatic hydrocarbon foaming agent. The aqueous suspension is heated at a temperature of from about 40° C. to 140° C. for a period of from about 0.5 to 15 hours to incorporate the hexabromocyclododecane and the foaming agent into the polymer particles and to form fire-retardant expandable thermoplastic beads, which are then separated from the water. This process yields expandable thermoplastic beads which can be readily formed into molded foam articles having excellent physical and fire-retardant properties.

DETAILED DESCRIPTION OF THE INVENTION

The vinyl aromatic polymer particles suitable for use in the process of this invention may be spherical or irregularly shaped particles of any of the thermoplastic vinyl aromatic polymers usable in the preparation of molded foam articles. Although homopolymers or copolymers of any vinyl aromatic monomer may be employed, styrene and substituted styrene monomers are preferred. Examples of suitable vinyl aromatic monomers include, but are not limited to, styrene, α-methyl styrene, ar-methyl styrene, ar-ethyl styrene, ar-isopropyl styrene, ar-tert-butyl styrene, vinyl toluene, vinyl xylene, ar-chlorostyrene, ar-chloromethylstyrene, vinyl naphthalene, divinyl benzene, and the like. Minor amounts (i.e., up to about 50 mole percent) of other ethylenically unsaturated copolymerizable monomers may also be used, including, for example, butadiene, acrylic acid, methacrylic acid, maleic anhydride, methyl methacrylate, acrylonitrile, and the like. The vinyl aromatic polymer may be rubber modified with an elastomer such as polybutadiene or styrene/butadiene block or random copolymers. The vinyl aromatic polymer particles should preferably be from about 0.1 to 2 mm in average diameter. Methods of obtaining suitable particles such as suspension polymerization or pelletization are well known in the art.

The hexabromocyclododecane to be used as the fire-retardant agent in the process of this invention can be any of the hexabrominated derivatives of cyclododecatriene. Any of the isomers of hexabromocyclododecane are suitable for use. Mixtures of different isomers of hexabromocyclododecane can also be employed. The average particle size of the hexabromocyclododecane should in any case, however, be less than about 100 microns and is preferably less than about 25 microns. Average particle size may be readily determined by means of electron microscopy. Hexabromocyclododecane is available commercially from Ameribrom, Inc., Ethyl Corp. ("SAYTEX HBCD"), and Great Lakes Chemical Corp. ("CD-75P"). Micronized hexabromocyclododecane may be obtained by grinding or milling coarser grades of hexabromocyclododecane or by any other suitable method.

To render the vinyl aromatic polymer particles effectively fire-retardant, from about 0.1 to 2.5 parts by weight of the micronized hexabromocyclododecane per 100 parts by weight of the particles is preferably present in the aqueous suspension. Most preferably, the level of hexabromocyclododecane is from about 0.5 to 1.5 parts per weight per 100 parts by weight of the particles.

Generally speaking, at least about 70 percent of the micronized hexabromocyclododecane charged to the aqueous suspension is typically incorporated into the thermoplastic polymer particles using the process of this invention. When a coarse grade of hexabromocyclododecane is employed in the impregnation, bromine levels in the treated beads are much lower than if micronized hexabromocyclododecane is used. The flame resistance of molded articles produced using such beads is considerably less than that of foam articles prepared using beads treated with micronized hexabromocyclododecane.

An additional advantage of the process of this invention is that the amount of hexabromocyclododecane which remains in the aqueous phase after impregnation is minimal. Thus, waste water treatment costs are lower and less hexabromocyclododecane is needed to obtain a desired level of fire-retardant in the beads than when coarse grades of hexabromocyclododecane are used. Suitable $C_4$–$C_6$ aliphatic hydrocarbon foaming agents include n-butane, isobutane, n-pentane, isopentane, n-hexane, 2-methyl pentane, 3-methyl pentane, cyclohexane, cyclopentane, and cyclobutane. Mixtures of such foaming agents may also be employed. The use of $C_5$ aliphatic hydrocarbons, especially n-pentane, isopentane, cyclopentane or mixtures thereof is preferred. Although from about 3 to 20 parts by weight foaming agent per 100 parts by weight vinyl aromatic polymer particles may be used, the preferred amount is from about 5 to 12 parts foaming agent.

The components described above are suspended in from about 50 to 500 parts (preferably, about 75 to 250 parts) by weight water per 100 parts by weight of the particles using an effective amount of one or more suitable suspending agents. Any of the suspending agents useful in the suspension impregnation of vinyl aromatic polymer particles or the suspension polymerization of vinyl aromatic monomers may be used. Examples of suitable suspending agents include finely divided water-insoluble inorganic substances such as tricalcium phosphate, zinc oxide, bentonite, talc, kaolin, magnesium carbonate, aluminum oxide and the like as well as water-soluble polymers such as polyvinyl alcohol, partially hydrolyzed polyvinyl acetate, hydroxyethyl cellulose, polyacrylic acid, methyl cellulose, polyvinyl pyrrolidone, and the like. An anionic surfactant extender such as a sodium linear alkylbenzene sulfonate (preferably, from about 0.001 to 0.10 parts by weight per 100 parts by weight vinyl aromatic polymer particles) may also be employed. Such extenders are described, for example, in U.S. Pat. No. 2,673,194 (incorporated herein by reference in its entirety). The use of tricalcium phosphate together with a sodium linear alkylbenzene sulfonate is particularly preferred. The amount of the suspending agent necessary to form a stable suspension of the vinyl aromatic polymer particles in the water will vary depending on a number of factors, but will generally be from about 0.1 to 5 parts by weight per 100 parts by weight of the vinyl aromatic polymer particles. One or more nonionic surfactants such as a polyoxyalkylene derivative of sorbitan monolaurate or other fatty acid ester or an ethylene oxide/propylene oxide block copolymer, can also be added to the aqueous suspension if desired. The preferred amount of nonionic surfactant is from about 0.01 to 1 part by weight per 100 parts by weight vinyl aromatic polymer particles.

Depending upon the end use, molded foam articles containing higher amounts of hexabromocyclododecane will generally be self-extinguishing without the aid of synergists such as organic peroxide, azo, or ether compounds. At lower levels of hexabromocyclododecane, however, it is preferred to use from about 0.01 to 2.0 parts by weight of an organic peroxide synergist per 100 parts by weight vinyl aromatic polymer particles. It is believed the synergist enhances the fire retardancy of the hexabromocyclododecane by lowering the molecular weight of the vinyl aromatic polymer as the foam burns. The synergist is preferably present in the aqueous suspension during impregnation. Organic peroxides having a half life of 1 hour or more at temperatures greater than 100° C. are preferred for use as synergists. This limitation is necessary to prevent premature decomposition of the peroxide during the impregnation step. Illustrative examples of useful peroxide synergists include $\alpha,\alpha'$-bis(t-butyl-peroxy diisopropyl) benzene, dicumyl peroxide, di-tert-butyl peroxide, cumene hydroperoxide, t-butylperacetate, 2,5-dimethyl-2,5-di(tert-butyl peroxy)hexane, di(3-tert-butyl peroxy-1,3-dimethylbutyl) carbonate, benzoyl peroxide, and 2,5-dimethyl-2,5-di(tert-butyl peroxy)-3-hexyne.

If desired, other additives such as lubricants, dyes, colorants, acid scavengers, and anti-oxidants may also be added to the aqueous suspension. Such additives will be incorporated into the vinyl aromatic polymer particles during impregnation together with the hexabromocyclododecane and the foaming agent.

The aqueous suspension is heated, preferably while stirring or mixing, at a temperature of from about 40° C. to 140° C. (preferably, from about 80° C. to 130° C.) for a period of from about 0.5 to 15 hours (preferably, from about 1 to 5 hours) until the hexabromocyclododecane and the aliphatic hydrocarbon foaming agent are incorporated into the vinyl aromatic polymer particles. The temperature may advantageously be varied during this impregnation step.

Following impregnation, the fire-retardant expandable vinyl aromatic polymer beads are separated from the water using an appropriate method such as filtration, centrifugation, or decantation. The beads may be washed with additional water and then dried, if desired. If a suspending agent such as tricalcium phosphate is used, it may be desirable to first wash the beads with dilute acid (hydrochloric acid, for example) to remove the suspending agent.

The fire-retardant expandable vinyl aromatic polymer beads produced by the process of this invention may be readily shaped into molded foam articles by heating in molds which are not gastight when closed. The beads expand and fuse together to form the molded article. Prior to the final molding step, the beads preferably are pre-expanded. Such methods of preparing molded-bead foams are well-known and are described, for example, in Ingram et al "Polystyrene and Related Thermoplastic Foams" *Plastic Foams,* Marcel Dekker (1973), Part II, Chapter 10, pp. 531–581, Ingram "Expandable Polystyrene Processes" *Addition and Condensation Polymerization Process* American Chemical Society (1969), Chapter 33, pp. 531–535. The teachings of these references are incorporated herein in their entirety.

Molded foam articles prepared using the fire-retardant expandable vinyl aromatic beads of this invention are highly resistant to flame, even when relatively low levels of the hexabromocyclododecane are present. The hexabromocyclododecane is incorporated within the beads rather than coated on the surface of the beads and thus does not interfere with the fusion of the beads when they are expanded into molded foam articles. The density, tensile strength, heat resistance and other physical and mechanical properties of the foams are unaffected by the presence of the hexabromocyclododecane if the process of this invention is employed.

Without further elaboration, it is believed that one skilled in the art can, using the preceding description, utilize the present invention to its fullest extent. The following examples, therefore, are to be considered as merely illustrative and not limitative of the claims or remainder of the disclosure in any way whatsoever.

EXAMPLES-GENERAL FOAMING METHOD

Fire-retardant expandable polystyrene beads were prepared as described below, pre-expanded, and then molded by vacuum charging to a 2"×8" diameter preheated mold cavity. The beads were fused at about 115° C. for 5–10 seconds in the mold; the resulting foam disc was then cooled by circulating water in the mold.

VERTICAL TEST METHOD

A number of 6×1×½ inch specimens were cut from each foam disc and conditioned at 60° C. under vacuum for 16 hours. Each specimen was hung lengthwise from a clamp and a microburner having a ¾ inch yellow flame was used to contact the bottom edge of the foam sample for 3 seconds. The average vertical burn time (time from the withdrawal of the flame to flameout of the foam) for 5 samples was determined.

IMPREGNATION PROCEDURE

Pop bottles were charged with the following materials:

| | |
|---|---|
| 100 mL | distilled water |
| 100 g | polystyrene beads (ave. diameter ca. 1 mm; 220,000 molecular weight) |
| 0.833 g | hexabromocyclododecane |
| 8.1 g | foaming agent[1] |
| 2.0 g | tricalcium phosphate (suspending agent) |
| 0.10 g | Tween ® 20[2] (surfactant) |
| 1.3 mL | 1% Nacconol[3] (auxiliary suspending agent) |
| 0.015 g | dibutyltin maleate[4] (acid scavenger) |
| 0.10 g | 2,6-di-tert-butyl-p-cresol[5] (anti-oxidant) |
| 0.045 g | polyethylene wax[6] (lubricant) |
| 0.20 g | α,α'bis(t-butyl-peroxy diisopropyl)benzene[7] (organic peroxide synergist) |

The bottles were shaken, sealed, and placed in a bottle tumbler. The bottles were heated 2 hours at 90° C. and then 2 hours at 125° C. After cooling the bottles to room temperature, the impregnated beads were collected by filtration, washed with 1N HCl, and tray dried. The amount of hexabromocyclododecane incorporated into the beads was determined by measuring the bromine content of the beads.

DESCRIPTION OF HEXABROMOCYCLODODECANE SAMPLES EMPLOYED

Average particle size was estimated by electron microscopy.

A: Micronized hexabromocyclododecane obtained from Great Lakes Chemical; m.p. 185°–195° C.; ave. particle size ca. 1 micron (large agglomerates of small particles present).

B: Micronized hexabromocyclododecane obtained from Great Lakes Chemical; m.p. 180°–193° C.; ave. particle size ca. 1 micron (large agglomerates of small particles present).

C: Micronized hexabromocyclododecane obtained from Great Lakes Chemical; m.p. 160°–185° C.; ave. particle size ca. 1 micron (large agglomerates of small particles present).

D: Micronized hexabromocyclododecane obtained from Great Lakes Chemical; m.p. 140°–165° C.; ave. particle size ca. 1 micron (large agglomerates of small particles present).

E: Hexabromocyclododecane obtained from Great Lakes Chemical; m.p. 185 –195° C.; wide range of particle sizes, including numerous particles over 100 microns in diameter.

F: Hexabromocyclododecane obtained from Ethyl Corporation; m.p. 185°–195° C.; average particle size greater than 100 microns.

G: Micronized hexabromocyclododecane obtained from White Chemical; m.p. 180°–185° C.; average particle size ca. 1 micron.

H: Hexabromocyclododecane obtained from White Chemical; m.p. 180°–85° C.; average particle size greater than 100 microns I: Micronized hexabromocyclododecane obtained from White Chemical; m.p. 183°–190° C.; average particle size ca. 1 micron.

J: Hexabromocyclododecane obtained from White Chemical; m.p. 185°–190° C.; average particle size greater than 100 microns.

RESULTS

The degree of hexabromocyclododecane incorporation into the impregnated beads as well as the flame resistance of the foam discs are given in Table I. The use of micronized hexabromocyclododecane (Examples 1–4, 9, 11, 13, and 15) resulted in substantially greater incorporation of the flame retardant into the polystyrene beads than when coarser grades of hexabromocyclododecane were employed (Examples 5–8, 10, 12, 14, and 16). In addition, the foam discs containing beads prepared using micronized hexabromocyclododecane had much greater resistance to flame, as reflected in the shorter vertical burn times observed. For example, while only about 55% of the flame retardant was incorporated when a coarse grade of hexabromocyclododecane was used (Example 10), about 74% was incorporated using micronized hexabromocyclododecane having the same melting point range/isomer composition (Example 9). Even more surprisingly, the vertical burn time was about 8 times longer when the coarse hexabromocyclododecane was used.

TABLE I

| Example No. | Hexabromocyclododecane Sample | % Incorporation | Vertical Burn (sec.) |
|---|---|---|---|
| 1 | A | 77 | 1.3 |

TABLE I-continued

| Example No. | Hexabromocyclododecane Sample | % Incorporation | Vertical Burn (sec.) |
|---|---|---|---|
| 2 | B | 77 | 1.3 |
| 3 | C | 80 | 2.4 |
| 4 | D | 82 | 2.6 |
| 5* | E | 61 | 3.1 |
| 6* | E | 53 | 7.5 |
| 7* | F | 50 | 9.4 |
| 8* | F | 48 | 10.1 |
| 9 | G | 74 | 1.7 |
| 10* | H | 55 | 13.0 |
| 11 | I | 79 | 1.4 |
| 12* | J | 35 | 11.6 |
| 9 | | | |
| 13 | G | 80 | 4.0 |
| 14* | H | 56 | 8.4 |
| 15 | I | 84 | 3.7 |
| 16* | J | 39 | 16.0 |

*Comparative Example

We claim:

1. A process for preparing fire-retardant expandable thermoplastic beads comprising
   (a) forming an aqueous suspension of 100 parts by weight vinyl aromatic polymer particles, from about 50 to 500 parts by weight water, an effective amount of a suspending agent, from about 0.1 to 2.5 parts by weight of hexabromocyclododecane having an average particle size of less than about 100 microns, and from about 3 to 20 parts by weight of a $C_4$–$C_6$ aliphatic hydrocarbon foaming agent, said aqueous suspension being characterized by the absence of pentaerythritol tetrastearate;
   (b) heating the aqueous suspension at a temperature of from about 40° C. to 140' C. for a period of from about 0.5 to 15 hours to incorporate the hexabromocyclododecane and the foaming agent into the polymer particles and to form fire-retardant expandable thermoplastic beads; and
   (c) separating the beads from the water.

2. The process of claim 1 wherein the vinyl aromatic polymer particles are polystyrene particles.

3. The process of claim 1 wherein the suspending agent is tricalcium phosphate.

4. The process of claim 1 wherein the hexabromocyclododecane has an average particle size of less than about 25 microns.

5. The process of claim 1 wherein the $C_4$–$C_6$ aliphatic hydrocarbon foaming agent is a $C_5$ aliphatic hydrocarbon.

6. The process of claim 1 comprising the additional steps after step (c) of washing and drying the separated beads.

7. The process of claim 1 wherein the average diameter of the vinyl aromatic polymer particles is from about 0.1 to 2.0 mm.

8. The process of claim 1 wherein from about 0.01 to 1 part by weight of a nonionic surfactant and from about 0.001 to 0.10 parts by weight of an anionic surfactant extender per 100 parts by weight of the vinyl aromatic polymer particles are also present in the aqueous suspension.

9. The process of claim 1 wherein from about 0.01 to 2.0 parts by weight of an organic peroxide synergist per 100 parts by weight vinyl aromatic polymer particles are also present in the aqueous suspension.

10. A process for preparing fire-retardant expandable polystyrene beads comprising:
    (a) forming an aqueous suspension of 100 parts by weight polystyrene particles having an average diameter of from about 0.1 to 2.0 mm, from about 75 to 250 parts by weight water, from about 0.1 to 5 parts by weight tricalcium phosphate suspending agent, from about 0.001 to 0.10 parts by weight of a sodium linear alkylbenzene sulfonate extenter, from about 0.5 to 1.5 parts by weight of hexabromocyclododecane having an average particle size of less than about 25 microns, from about 0.01 to 2.0 parts by weight of an organic peroxide synergist, and from about 5 to 12 parts by weight of a $C_5$ aliphatic hydrocarbon foaming agent, said aqueous suspension being characterized by the absence of pentaerythritol tetrastearate;
    (b) heating the aqueous suspension at a temperature of from about 80° C. to 130° C. for a period of from about 1 to 5 hours to incorporate the hexabromocyclododecane and n-pentane into the polystyrene particles and to form fire-retardant expandable polystyrene beads;
    (c) separating the beads from the water;
    (d) washing the separated beads; and
    (e) drying the washed beads.

11. The process of claim 10 wherein the separated beads are washed with dilute hydrochloric acid in step (d).

12. The process of claim 10 wherein from about 0.01 to 1 part by weight of a nonionic surfactant per 100 parts by weight polystyrene particles is also present in the aqueous suspension.

13. The process of claim 12 wherein the nonionic surfactant is a polyoxyalkylene sorbitan fatty acid ester.

14. The process of claim 10 wherein the organic peroxide synergist is selected from the group consisting of $\alpha,\alpha'$-bis(t-butyl-peroxy diisopropyl)benzene and dicumyl peroxide.

* * * * *